(12) United States Patent
Lieber

(10) Patent No.: US 9,594,679 B2
(45) Date of Patent: Mar. 14, 2017

(54) FLASH CACHE FLUSHING METHOD AND SYSTEM

(75) Inventor: Opher Lieber, Kfar-Saba (IL)

(73) Assignee: SANDISK IL LTD., Kfar Saba (IL)

( * ) Notice: Subject to any disclaimer, the term of this patent is extended or adjusted under 35 U.S.C. 154(b) by 673 days.

(21) Appl. No.: 12/214,291

(22) Filed: May 1, 2008

(65) Prior Publication Data

US 2009/0276562 A1 Nov. 5, 2009

(51) Int. Cl.
*G06F 12/02* (2006.01)
*G06F 12/08* (2016.01)

(52) U.S. Cl.
CPC ...... *G06F 12/0804* (2013.01); *G06F 12/0246* (2013.01)

(58) Field of Classification Search
CPC .................. G06F 12/0246; G06F 2212/7203
See application file for complete search history.

(56) References Cited

U.S. PATENT DOCUMENTS

| | | | |
|---|---|---|---|
| 4,323,968 A | | 4/1982 | Capozzi |
| 5,036,460 A | * | 7/1991 | Takahira .............. G06K 19/073 711/103 |
| 5,146,573 A | * | 9/1992 | Sato .................... G11C 11/4096 711/206 |
| 5,202,969 A | * | 4/1993 | Sato .................... G11C 11/4096 711/143 |
| 5,283,886 A | * | 2/1994 | Nishii ................. G06F 12/0833 711/121 |
| 5,603,001 A | * | 2/1997 | Sukegawa ............. G06F 3/0601 711/103 |
| 5,671,388 A | * | 9/1997 | Hasbun ............... G06F 12/0246 365/168 |
| 5,708,605 A | * | 1/1998 | Sato ....................... G11C 16/32 365/185.18 |
| 5,925,139 A | * | 7/1999 | Yamada ............... G11C 16/225 711/152 |
| 5,930,167 A | | 7/1999 | Lee et al. |
| RE36,732 E | * | 6/2000 | Miyamoto ......... G11C 16/3418 365/185.24 |
| 6,122,193 A | | 9/2000 | Shibata et al. |
| 6,438,644 B1 | * | 8/2002 | Lin ..................... G11C 16/225 365/185.09 |

(Continued)

FOREIGN PATENT DOCUMENTS

| | | |
|---|---|---|
| EP | 1465203 | 10/2004 |
| WO | WO 2009/083954 | 7/2009 |

OTHER PUBLICATIONS

International Search Report Dated Jun. 3, 2009 From the International Searching Authority Re.: Application No. PCT/IL2008/001632.

(Continued)

*Primary Examiner* — Edward Dudek, Jr.
(74) *Attorney, Agent, or Firm* — Toler Law Group, PC

(57) ABSTRACT

A flash memory system that uses repeated writing of the data to achieve stable storage, is adapted for efficient cache flushing operations by utilizing a part of the non-volatile flash memory array as a designated buffer for the data, in which data integrity is retained until all repeat writing thereof is complete. Repeated writing is carried out from the designated buffer directly to the final storage locations in the flash memory array, for example using simple internal copy back operations.

20 Claims, 3 Drawing Sheets

(56) References Cited

U.S. PATENT DOCUMENTS

| | | | | |
|---|---|---|---|---|
| 6,522,580 B2* | 2/2003 | Chen | G11C 11/5621 | 365/185.02 |
| 6,678,785 B2 | 1/2004 | Lasser | | |
| 6,907,497 B2* | 6/2005 | Hosono | G11C 16/3454 | 365/185.22 |
| 7,149,111 B2* | 12/2006 | Murin | G06F 3/0626 | 365/185.03 |
| 7,466,597 B2* | 12/2008 | Kim | G06F 11/1068 | 365/185.17 |
| 7,779,341 B2* | 8/2010 | Kim | G06F 11/1068 | 714/766 |
| 7,924,628 B2* | 4/2011 | Danon | G11C 11/5628 | 365/185.22 |
| 7,961,513 B2* | 6/2011 | Ho | G11C 11/5628 | 365/185.03 |
| 8,050,086 B2* | 11/2011 | Shalvi | G11C 16/26 | 365/185.02 |
| 8,132,045 B2* | 3/2012 | Avila | G06F 11/141 | 711/103 |
| 8,228,728 B1* | 7/2012 | Yang | G11C 11/5628 | 365/185.03 |
| 2001/0028523 A1* | 10/2001 | Moro | G11C 29/70 | 360/53 |
| 2002/0013886 A1* | 1/2002 | Higuchi | G06F 12/0817 | 711/130 |
| 2002/0129191 A1* | 9/2002 | DaCosta | G06F 12/0893 | 711/103 |
| 2002/0166022 A1* | 11/2002 | Suzuki | G06F 12/0866 | 711/103 |
| 2003/0151972 A1* | 8/2003 | Kiso | G11C 7/22 | 365/233.1 |
| 2004/0078513 A1* | 4/2004 | Yamazaki | G06F 12/0292 | 711/104 |
| 2005/0071592 A1* | 3/2005 | DeCaro | G06F 12/1425 | 711/163 |
| 2005/0195635 A1* | 9/2005 | Conley | G06F 12/0862 | 365/149 |
| 2005/0195975 A1* | 9/2005 | Kawakita | H04L 9/0822 | 380/30 |
| 2005/0251617 A1* | 11/2005 | Sinclair | G06F 3/061 | 711/103 |
| 2005/0289314 A1* | 12/2005 | Adusumilli | G06F 11/1068 | 711/168 |
| 2006/0050576 A1* | 3/2006 | Kim | G06F 11/1068 | 365/200 |
| 2006/0059406 A1* | 3/2006 | Micheloni | G06F 11/1048 | 714/763 |
| 2006/0123164 A1* | 6/2006 | Rai | G11C 7/1006 | 710/62 |
| 2006/0132822 A1* | 6/2006 | Walmsley | G06F 12/1408 | 358/1.14 |
| 2006/0271755 A1* | 11/2006 | Miura | G06F 11/1068 | 711/165 |
| 2006/0294295 A1* | 12/2006 | Fukuzo | G06F 13/1673 | 711/105 |
| 2006/0294312 A1* | 12/2006 | Walmsley | H04L 9/0662 | 711/122 |
| 2007/0005894 A1* | 1/2007 | Dodge | G06F 12/0866 | 711/118 |
| 2007/0174578 A1* | 7/2007 | Oshima | G06F 12/0246 | 711/170 |
| 2007/0186040 A1* | 8/2007 | Kasahara | G06F 11/073 | 711/115 |
| 2007/0239927 A1* | 10/2007 | Rogers | G06F 3/061 | 711/103 |
| 2007/0283081 A1* | 12/2007 | Lasser | G06F 12/0246 | 711/103 |
| 2008/0082735 A1* | 4/2008 | Shiga | G06F 13/28 | 711/103 |
| 2008/0172518 A1* | 7/2008 | Shmulevich | G06F 12/0246 | 711/103 |
| 2008/0189478 A1* | 8/2008 | Chae | G06F 12/0246 | 711/103 |
| 2008/0195894 A1* | 8/2008 | Schreck | G06F 11/1056 | 714/34 |
| 2008/0209114 A1* | 8/2008 | Chow | G06F 12/0804 | 711/103 |
| 2008/0244164 A1* | 10/2008 | Chang | G06F 12/0246 | 711/103 |
| 2009/0125643 A1* | 5/2009 | Prevost | G06F 3/0623 | 710/10 |
| 2009/0132755 A1* | 5/2009 | Radke | G06F 11/1068 | 711/103 |
| 2009/0164700 A1* | 6/2009 | Chen | G06F 12/0246 | 711/103 |
| 2009/0168525 A1* | 7/2009 | Olbrich | G06F 13/1657 | 365/185.11 |
| 2009/0172498 A1* | 7/2009 | Shlick | G06F 11/1064 | 714/764 |
| 2009/0204824 A1* | 8/2009 | Lin | G06F 12/0246 | 713/193 |
| 2009/0259799 A1* | 10/2009 | Wong | G06F 12/0207 | 711/103 |
| 2009/0276562 A1* | 11/2009 | Lieber | G06F 12/0804 | 711/103 |
| 2010/0131827 A1* | 5/2010 | Sokolov | G06F 11/1072 | 714/763 |
| 2014/0068156 A1* | 3/2014 | Lee | G06F 3/061 | 711/103 |
| 2014/0310574 A1* | 10/2014 | Yu | G06F 11/1072 | 714/773 |

OTHER PUBLICATIONS

Written Opinion Dated Jun. 3, 2009 From the International Searching Authority Re.: Application No. PCT/IL2008/001632.

International Preliminary Report on Patentability Dated Jul. 8, 2010 From the International Bureau of WIPO Re. Application No. PCT/IL2008/001632.

Official Action Dated Aug. 24, 2011 From the US Patent and Trademark Office Re. U.S. Appl. No. 12/005,368.

Official Action Dated Jan. 26, 2012 From the US Patent and Trademark Office Re. U.S. Appl. No. 12/005,368.

Response Dated Nov. 30, 2011 to Official Action of Aug. 24, 2011 From the US Patent and Trademark Office Re. U.S. Appl. No. 12/005,368.

Notice of Allowance and Fee(s) Due mailed Jan. 24, 2013 in U.S. Appl. No. 12/005,368, 5 pages.

Notice of Allowance and Fee(s) Due mailed Aug. 24, 2012 in U.S. Appl. No. 12/005,368, 10 pages.

* cited by examiner

FLASH CACHE FLUSHING METHOD AND SYSTEM

FIELD AND BACKGROUND OF THE INVENTION

The present invention, in some embodiments thereof, relates to a flash memory and to cache flushing, and, more particularly, but not exclusively, to cache flushing in the case of multiple copying of the same data from the cache for stable storage.

The present embodiments are applicable to flash storage systems that on the one hand use a self-caching mechanism for data received from a host, and on the other hand use flash memory technology that requires data to be copied more than once into the memory die in order to achieve reliable and interference-free storage of the data. In such systems the prior art practice for flushing the cache involved copying data from the cache storage area to the main storage area in order to make room for additional data. Such cache flushing involves the sequence of operations by the flash controller that is described in FIG. 3 below. The procedure is summarized as follows, making use of the reference numerals of FIG. 3.

60. Select what portion of the data currently in the cache is to be flushed.

62. Read the selected data from the cache memory cells to the flash memory data register.

64. Transfer the data from the flash memory data register to the flash controller.

66. Modify the data, at the controller, for long-range storage in the main storage area. This may involve conditioning with error correction codes, executing interleaving schemes, adding control fields, etc.

68. Transfer the modified data from the flash controller to the flash memory data register 70. Write the modified data from the data register to the main storage area cells 72. Repeat steps 62-72 once for each additional time the data have to be re-written into the main storage area.

The above procedure is clearly inefficient as it repeats the data transfer in and out of the flash memory die multiple times, and the data processing required for modifying the data is likewise unnecessarily repeated. It is thus desirable to reduce the time wasted due to this inefficiency.

One might think the problem can be solved by writing the data multiple times from the flash data register to the main storage area cells, without sending the data each time from the controller to the data register. This, however, will not work for the following reasons:

1. In most flash memory dies the data register contents are destroyed during the register-to-array writing process.

2. Even if the data in the register is preserved during writing, the typical sequence to be followed when writing the data multiple times interleaves the writing of multiple pages, so that after writing a first page a first time, a second page has to be written before the first page is written a second time. Therefore the data cannot be preserved in the data register between multiple writes of the same data.

One reason that the same data may need to be written multiple times is due to the interference effect of neighboring Flash memory cells in high density flash constructions. Such interference is dependent on the actual data in neighboring cells and therefore can only be accounted for at write time. Thus it is necessary to actually write the data into the Flash memory once, write the neighboring cells and then rewrite the same data. However, for the reasons noted, the data is most likely to have been removed from the data register before it can be written a second time.

Examples for self-caching flash storage systems are U.S. Pat. No. 5,930,167 to Lee et al. and U.S. patent application Ser. No. 11/318,906 to Lasser et al.

Examples for flash storage systems that require multiple writing of the same data can be seen in U.S. Pat. No. 6,522,580 to Chen et al. and U.S. Pat. No. 7,149,111 to Murin et al.

The common approach in the prior art is the one described above with respect to FIG. 3. U.S. patent application Ser. No. 12/005,368 (hereinafter '368) describes an approach to a similar problem—its solution is to apply the modifications to the data, in that case error correction and control (ECC) encoding, prior to storing it in the cache, and then doing the cache flushing using the flash die's copy-back operation that allows copying the data from the cache to the main area without sending it out to the flash controller. However, '368 suffers from the following drawbacks that make its solution less practical in many cases:

1. It requires the cache area to have enough storage space for storing the data accompanied by both cache-related metadata and main-area-related metadata (error codes, control fields).

2. It requires that the processing to be applied to the data be known at the time of placing the data into the cache. In practice, however, the processing is not fully known until cache flushing time. For example the data to be stored in the main area may require to be accompanied by a control field dependent on the physical address of the data. However the physical address is only determined at flushing time, and not at the time when the data is placed in the cache.

Another approach to the above problems may involve keeping a copy of the modified data in the flash controller and thus save on modifying the data again and again.

This approach however suffers from the following drawbacks:

1. It does solve the repeated data processing problem, but it does not solve the repeated data transfer problem.

2. It requires the controller to have extra memory for keeping the modified data while other data is being handled between successive writes of the modified data (as explained above). Depending on the exact writing sequence dictated by the flash memory, this requirement might translate into a large amount of controller memory that may increase the controller's price.

However, whenever the data is rewritten, inefficient utilization of the Flash controller and unnecessary data transfers are made, as described above.

SUMMARY OF THE INVENTION

The present embodiments provide for the designation of a buffer within the non-volatile flash memory to temporarily store data, retaining the integrity of the data until it has been written the required number of times into the memory. The writing is carried out using direct copying.

According to an aspect of some embodiments of the present invention there is provided a flash memory system, comprising:

a flash controller; and a flash memory array comprising a non-volatile long term storage area, a non-volatile cache storage area and a non-volatile buffer, wherein units of data are periodically copied from the cache storage area to the long term storage area via said flash controller;

wherein said flash controller is configured for conditioning said units of data copied from said cache storage area, thereby generating conditioned data units;

wherein said non-volatile buffer is configured to temporarily store said conditioned data units;

and wherein said system is configured to directly copy said conditioned data units from said non-volatile buffer to the long term storage area.

In an embodiment, said flash memory array is configured to require writing selected numbers of write times to storage locations therein, said numbers being greater than one for at least some locations, and wherein for at least one of the storage locations each one of said write operations is carried out by directly copying from said non-volatile buffer to said at least one storage location.

In an embodiment, said non-volatile buffer is configured to retain said temporarily stored conditioned data units until said selected number of write times has been reached.

In an embodiment, said direct writing comprises using die-internal copy back operations.

An embodiment may be configured to carry out said direct copying each time to a same location for any given temporarily stored conditioned data unit.

In an embodiment, said non-volatile buffer storage area is designated dynamically.

In an embodiment, one of said selected numbers of write times is two.

In an embodiment, said non-volatile buffer is operated in single bit per cell (SLC) mode.

According to a second aspect of the present invention there is provided a method of copying of data from a nonvolatile cache storage area into a storage location in a flash array, comprising:

selecting data in the nonvolatile cache storage area to be copied;

first forwarding of said data to a flash controller;

conditioning said data in said flash controller;

second forwarding of said data in conditioned form back to the flash array;

at the flash array storing the data in a temporary non-volatile buffer; and directly copying said data from the temporary non-volatile buffer into the storage location.

An embodiment may comprise carrying out said conditioning and first and second forwarding once and said direct copying a plurality of times, to a plurality of locations at least one of which is said storage location.

In an embodiment, said direct copying to said storage location comprises using a flash die copy back operation.

In an embodiment, said direct copying is carried out a plurality of times and wherein the storage location in the main storage area to which the data is copied each time is substantially the same location.

In an embodiment, the conditioned form of the data is the same as the selected data.

In an embodiment, the conditioned form of the data is different at least in part from the selected data.

An embodiment may comprise operating the temporary non-volatile buffer in an SLC storage mode.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
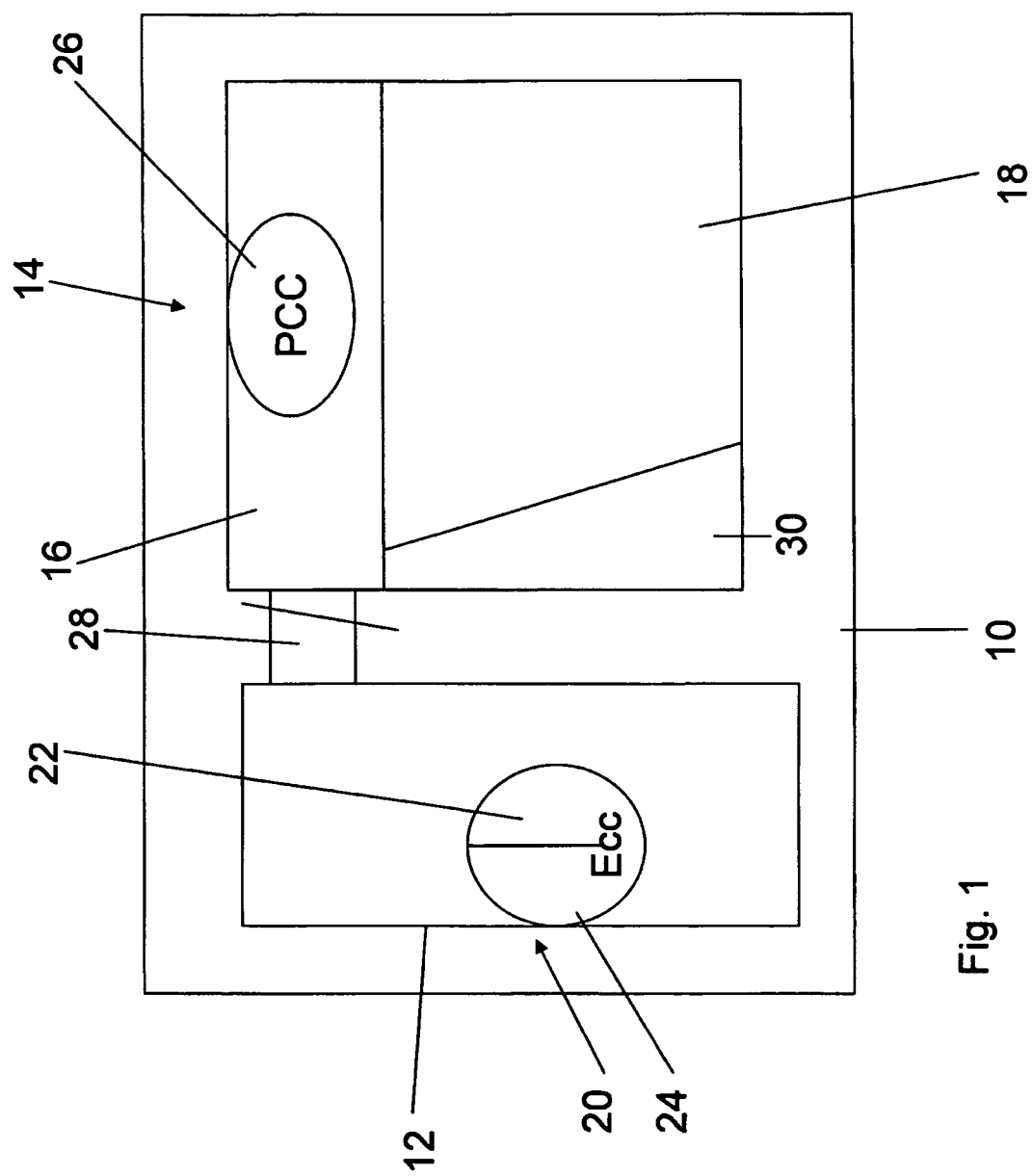
FIG. 1 is a simplified diagram showing a flash memory system modified according to a first embodiment of the present invention.

The present invention, in some embodiments thereof, relates to a flash memory and to cache flushing, and, more particularly, but not exclusively, to cache flushing in the case of multiple writes of the same data for stable storage in high density flash.

A flash memory system that uses repeated writing of the data to achieve stable storage, is adapted for efficient cache flushing operations by utilizing a part of the non-volatile flash memory array as a designated buffer for the data. The data is retained in the buffer until it has been written into the main memory the prescribed number of times, and each time the data is copied using direct copying. Direct copying refers to copying wholly within the flash memory dye without the data passing out of the dye to the flash controller. Direct copying may be carried out using the copy back operation typically provided with a flash memory system. That is to say, such writing by repeated copying is carried out from the designated buffer directly to the final storage locations in the flash memory array, for example using the above referred to internal copy back operations.

The present embodiments may involve saving transfer and processing time by doing the transfer and conditioning once, and then keeping the modified data in the temporary nonvolatile buffer within the flash die and use it again for additional writing cycles without having to transfer and process the data again. The term "conditioning" refers to preparation of the data for long term storage in the flash memory, involving error detection and correction encoding and like processes to allow for successful recovery of the data at the end of the storage. In certain cases the data may already be in suitable condition for the intended storage so that conditioning does not involve actual modification of the data at all.

That is to say, the present embodiments involve designating some of the Flash memory as a buffer for segments of data that are to be written repeatedly. The segments to be repeated are placed into the buffer after processing, and are written and rewritten as required. The buffer may be made as large as necessary and in embodiments its location may change dynamically so that at different points in time the designated buffer is located at different locations within the flash array.

In one embodiment the same area of the flash is always used as the buffer, being selected either at design time or at manufacturing time, or at power up time or the like. In a second embodiment, for each flush operation an area of one or more flash blocks that are currently free to use, and do not contain data is selected.

Before explaining at least one embodiment of the invention in detail, it is to be understood that the invention is not necessarily limited in its application to the details of construction and the arrangement of the components and/or methods set forth in the following description. The invention is capable of other embodiments or of being practiced or carried out in various ways.

Referring now to the drawings, FIG. 1 illustrates a flash memory system for use with the present embodiments. The flash memory system 10 comprises a flash controller 12, and a memory die 14. The memory die 14 comprises a cache storage area 16, and a main storage area 18. The flash controller comprises error correction circuitry 20. The error correction circuitry includes an input part 22 for adding parity bits to data to be stored and an error detection and correction part 24 for using the parity bits to detect and correct errors in the data after storage.

The memory die 14 includes page copy circuitry 26 for supporting a copy back operation, that is copying data from one region to another within the memory die. The page copy circuitry 26 of the memory die does not include error correction capability. However page copy circuitry 26 may include functionality to support copying between areas having different numbers of bits per cell. All data being moved between the die and the flash controller typically passes over data bus 28.

As explained above, in the prior art, data that needs to be repeatedly written to the storage area 18 arrives at cache 16 from the controller 12. From the cache, the data is written into the main memory 18 the first time. The prior art solution is therefore to repeat the entire cycle via the flash controller and the cache. However according to the present embodiments there is provided a designated area 30 into which the data for repeated writing is temporarily copied from the cache and held until all the repeated writing operations are complete. Data integrity within this designated area 30 is guaranteed for the period until the repeated writing operations are completed, since the designated area is not used for any other purpose. Thus the data can be copied directly into the main storage location using a simple copy back operation based on page copy circuitry 26.

The designated area may be fixed, as mentioned above or one or more blocks of free flash memory may be designated for a specific cache flush operation.

The designated part may carry out repeated writing of any particular data item to the same or a different location in the main memory depending on the repeated writing algorithm being used. The data being repeatedly written is typically data being flushed from the cache, and may include data entered initially into the system or may be data previously stored which is being refreshed or transferred for any other reason.

The number of times that the data is rewritten in order to achieve optimal storage is at least two, generally depending on the density of the memory storage hardware used.

The repeated writing is carried out by direct copying of the data into the final storage area. Direct copying may involve the flash system's built-in copy-back operation.

Figure 2:
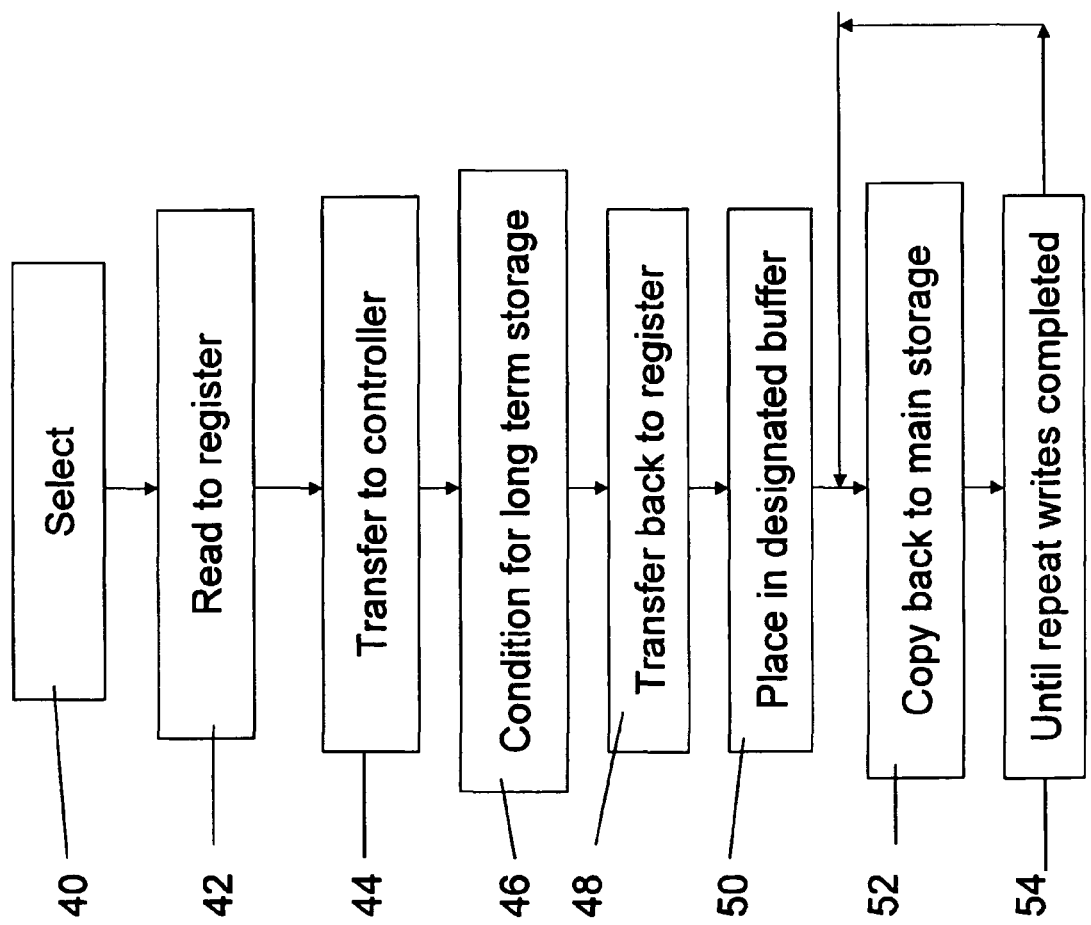
FIG. 2 is a simplified flow chart showing a procedure for repeated writing of data into the flash array using the embodiment of FIG. 1.

Reference is now made to FIG. 2, which is a simplified flow chart illustrating a procedure for flushing the cache and refreshing data which makes use of the present embodiments. First of all in 40, a portion of data is selected to be flushed. In 42 the selected data is read to the flash memory data register. In 44 the data is transferred from the flash memory data register to the flash controller. In 46 the data is modified or conditioned, using the controller, for long-range storage in the main storage area. This may involve adding error correction codes, executing interleaving schemes, adding control fields, etc.

In 48 the modified data is transferred back from the flash controller back to the flash memory data register. Then, in 50, the data may be written from the data register to the designated part 30, that is a temporary nonvolatile buffer in the storage device. Then in 52 the data in the designated buffer is directly copied, using a copy-back operation, from the temporary buffer to the main storage area.

As shown in 54, Stage 52 is repeated for each additional time the data have to be re-written into the main storage area One can see that the above procedure modifies the data only once and transfers the data into and out of the flash controller only once. The extra cost of the procedure of FIG. 2 is the time for writing the modified data into the temporary buffer in the flash storage device, as such a step is not required in the methods of the prior art. Therefore the question of whether the FIG. 2 embodiment provides an advantage over the prior art methods depends on whether the time for one extra writing into the flash device is longer or shorter than the time saved—the time of transfer and processing for the repeated write operations excluding the first one. It turns out that in many practical systems it is the case that the extra writing is shorter than the saved time and therefore the methodology of the embodiment of FIG. 2 is useful in improving the storage system's performance. This is especially so when the buffer storage area operates in a single bit per cell or SLC, storage mode, as such a storage area is relatively fast to write to. As discussed in the background, Flash arrays often allow different storage densities to be used in different parts of the array.

Figure 3:
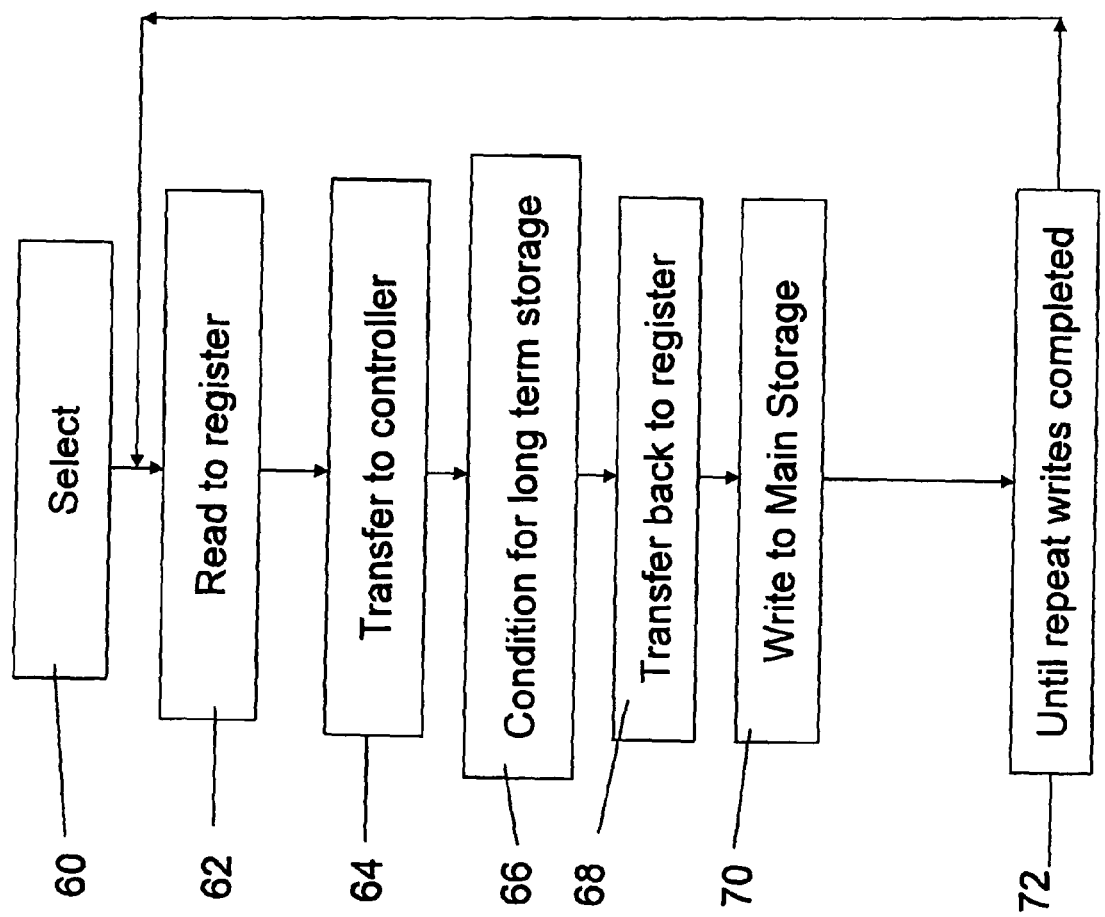
FIG. 3 is a simplified flow chart showing a procedure for repeated writing of the data into the flash array using a prior art method.

Reference is now briefly made to FIG. 3, which is another flow chart, illustrating the basic prior art system. FIG. 3, begins in the same way as FIG. 2. First of all in 60, a portion of data is selected to be flushed. In 62 the selected data is read to the flash memory data register. In 64 the data is transferred from the flash memory data register to the flash controller. In 66 the data is modified or conditioned, using the controller, for long-range storage in the main storage area. This may involve adding error correction codes, executing interleaving schemes, adding control fields, etc.

In 68 the modified data is transferred back from the flash controller back to the flash memory data register. In 70 the data is written to the main storage for the first time. However the data integrity cannot be guaranteed until the next time that the data is needed for repeated writing, so the original unconditioned data is the only copy whose integrity can be relied upon. This data however has to go through the flash controller as it is not conditioned for long term storage. Thus the loop back is now to stage 64 and each stage from 64 to 70 is repeated.

The terms "comprises", "comprising", "includes", "including", "having" and their conjugates mean "including but not limited to". This term encompasses the terms "consisting of" and "consisting essentially of".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A memory system, comprising:
    a memory comprising a data register and a flash memory array including a non-volatile long term storage area, a non-volatile cache storage area, and a non-volatile buffer area, wherein the non-volatile buffer area of the flash memory array is configured to operate in a single bit per cell (SLC) mode; and
    a controller configured to:
        select, from data located in the non-volatile cache storage area, a portion of the data;
        condition the portion of the data to generate conditioned data; and
        write the conditioned data from the data register to the non-volatile buffer area of the flash memory array,
    wherein the memory is configured to write the conditioned data to the non-volatile long term storage area of the flash memory array using a plurality of copy operations to copy the conditioned data from the non-volatile buffer area of the flash memory array directly to the non-volatile long term storage area of the flash memory array a plurality of times.

2. The memory system of claim 1, wherein writing the conditioned data from the data register to the non-volatile buffer area of the flash memory array and copying the conditioned data from the non-volatile buffer area of the flash memory array to the non-volatile long term storage area of the flash memory array enables user data in the data register to be overwritten with other user data prior to completion of the plurality of copy operations.

3. The memory system of claim 1, wherein for a given storage location, the non-volatile buffer area of the flash memory array is configured to retain the conditioned data until a selected number of write times corresponding to the storage location has been reached.

4. The memory system of claim 1, wherein the memory is further configured to write the conditioned data by performing die-internal copy back operations.

5. The memory system of claim 1, wherein a section of the non-volatile long term storage area of the flash memory array is configured such that storing the conditioned data in the section includes writing the conditioned data to a same storage location within the section the plurality of times.

6. The memory system of claim 1, wherein the controller is further configured to dynamically select the non-volatile buffer area of the flash memory array.

7. The memory system of claim 3, wherein one of the selected numbers of write times is two.

8. The memory system of claim 1, wherein the controller is configured to add an error correction code to the conditioned data.

9. A method of copying data from a non-volatile cache storage area into a non-volatile long term storage area of a flash memory array, the method comprising:
    selecting, from data in the non-volatile cache storage area, a portion of the data;
    sending the portion of the data to a controller;
    receiving, at a data register, conditioned data from the controller, the conditioned data based on the portion of the data;
    writing the conditioned data from the data register to a non-volatile buffer area of the flash memory array, wherein the non-volatile buffer area of the flash memory array is operated in a single bit per cell (SLC) mode; and
    writing, a plurality of times, the conditioned data at the non-volatile long term storage area of the flash memory array using a plurality of copy operations to copy the conditioned data from the non-volatile buffer area of the flash memory array directly to the non-volatile long term storage area of the flash memory array.

10. The method of claim 9, wherein writing the conditioned data from the data register to the non-volatile buffer area of the flash memory array and copying the conditioned data from the non-volatile buffer area of the flash memory array to the non-volatile long term storage area of the flash memory array enables user data in the data register to be overwritten with other user data prior to completion of the plurality of copy operations.

11. The method of claim 9, wherein the copying of the conditioned data from the non-volatile buffer area of the flash memory array to the non-volatile long term storage area of the flash memory array comprises using a copy back operation.

12. The method of claim 9, wherein the non-volatile buffer area of the flash memory array is selected dynamically.

13. The method of claim 9, wherein the conditioned data corresponds to the portion of the data with a control field and an error correction code received from the controller.

14. The method of claim 9, wherein the conditioned data in the non-volatile cache storage area is different from the portion of the data.

15. A method comprising:
  selecting, by a controller, a portion of data in a non-volatile cache storage area of a non-volatile memory including a flash memory array and a data register;
  receiving the portion of the data at the controller;
  conditioning the portion of the data in the controller to generate conditioned data;
  sending the conditioned data to the data register;
  transferring, by the controller, the conditioned data from the data register to a non-volatile buffer area of the flash memory array, the non-volatile buffer area of the flash memory array operating in a single bit per cell (SLC) mode; and
  initiating, by the controller, writing of the conditioned data at a non-volatile long term storage area of the flash memory array using a plurality of copy operations to copy the conditioned data from the non-volatile buffer area of the flash memory array directly to the non-volatile long term storage area of the flash memory array.

16. The method of claim 15, wherein the copying of the conditioned data to the non-volatile long term storage area of the flash memory array comprises using a copy back operation.

17. The method of claim 15, wherein the non-volatile buffer area of the flash memory array is designated dynamically.

18. The method of claim 15, wherein transferring the conditioned data from the data register to the non-volatile buffer area of the flash memory array and copying the conditioned data from the non-volatile buffer area of the flash memory array to the non-volatile long term storage area of the flash memory array enables user data in the data register to be overwritten with other user data prior to completion of the plurality of copy operations.

19. The method of claim 15, wherein generating the conditioned data includes adding an error correction code to the portion of the data.

20. The method of claim 15, wherein the copying includes using a copy back operation.

* * * * *